US010801673B2

(12) United States Patent
Ferre et al.

(10) Patent No.: US 10,801,673 B2
(45) Date of Patent: Oct. 13, 2020

(54) VALVE AND PRESSURIZED FLUID CYLINDER

(71) Applicant: L'Air Liquide, Société Anonyme pour l'Etude et l'Exploitation des Procédés Georges Claude, Paris (FR)

(72) Inventors: Aurélien Ferre, Antony (FR); Philippe Rudnianyn, Antony (FR); Celestin Batut, Antony (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 16/212,233

(22) Filed: Dec. 6, 2018

(65) Prior Publication Data

US 2019/0186696 A1 Jun. 20, 2019

(30) Foreign Application Priority Data

Dec. 19, 2017 (FR) ...................................... 17 62416

(51) Int. Cl.
*F16K 37/00* (2006.01)
*F17C 13/04* (2006.01)
*F16K 17/02* (2006.01)

(52) U.S. Cl.
CPC .............. *F17C 13/04* (2013.01); *F16K 17/02* (2013.01); *F17C 2201/032* (2013.01);
(Continued)

(58) Field of Classification Search
CPC ................ F17C 13/04; F17C 2250/032; F17C 2250/0478; F16K 37/0041
See application file for complete search history.

(56) References Cited

U.S. PATENT DOCUMENTS 5,137,052 A * 8/1992 Baumgart ............... F16K 31/60
116/277
5,223,822 A * 6/1993 Stommes ............ F16K 37/0008
116/277
(Continued)

FOREIGN PATENT DOCUMENTS

FR  3 016 681  7/2015
FR  3 034 837  10/2016
(Continued)

OTHER PUBLICATIONS

French Search Report for corresponding FR 1762416, dated Sep. 5, 2018.

*Primary Examiner* — Reinaldo Sanchez-Medina
(74) *Attorney, Agent, or Firm* — Elwood L. Haynes

(57) ABSTRACT

Valve for a pressurized fluid cylinder, comprising a sensor for sensing the position of the control member, said sensor being configured to generate an electric signal indicative of the position or of the fluid flow rate and/or pressure set by a regulating member for regulating flow rate/pressure, the sensor (9) for sensing the position of the control member comprising a conductive circuit having a given electrical resistance, a member for measuring an electric variable of the conductive circuit and a wiper, the conductive circuit and the wiper being movable relative to one another during the movement of the control member with respect to the body of the valve into different configurations in which the wiper modifies the shape and/or area of the conductive circuit measured by the measuring member.

6 Claims, 3 Drawing Sheets

(52) U.S. Cl.
CPC .. *F17C 2201/056* (2013.01); *F17C 2201/058* (2013.01); *F17C 2205/013* (2013.01); *F17C 2205/0326* (2013.01); *F17C 2205/0329* (2013.01); *F17C 2205/0338* (2013.01); *F17C 2205/0394* (2013.01); *F17C 2221/011* (2013.01); *F17C 2223/0123* (2013.01); *F17C 2223/036* (2013.01); *F17C 2250/032* (2013.01); *F17C 2250/034* (2013.01); *F17C 2250/043* (2013.01); *F17C 2250/0473* (2013.01); *F17C 2250/0478* (2013.01); *F17C 2250/0626* (2013.01); *F17C 2250/0636* (2013.01); *F17C 2260/026* (2013.01); *F17C 2265/04* (2013.01); *F17C 2270/02* (2013.01)

(56) References Cited

U.S. PATENT DOCUMENTS

| | | | | |
|---|---|---|---|---|
| 5,623,963 | A * | 4/1997 | Stommes | F16K 37/0008 137/554 |
| 6,098,646 | A * | 8/2000 | Hennemann | A47L 15/44 137/101.19 |
| 8,191,574 | B1 * | 6/2012 | Davis | F16K 1/302 116/227 |
| 2004/0045608 | A1 * | 3/2004 | Peters | F16K 31/60 137/552.7 |
| 2011/0140850 | A1 * | 6/2011 | Wassel | F17C 13/021 340/8.1 |
| 2014/0151589 | A1 * | 6/2014 | Cox | G01F 23/14 251/129.1 |
| 2014/0203026 | A1 | 7/2014 | Jaeger | |
| 2016/0265721 | A1 | 9/2016 | Verghade et al. | |
| 2016/0348844 | A1 | 12/2016 | Carron et al. | |
| 2017/0002983 | A1 | 1/2017 | Carron et al. | |
| 2018/0119887 | A1 | 5/2018 | Rezel et al. | |

FOREIGN PATENT DOCUMENTS

| | | |
|---|---|---|
| WO | WO 2014 072597 | 5/2014 |
| WO | WO 2015 110717 | 7/2015 |

* cited by examiner

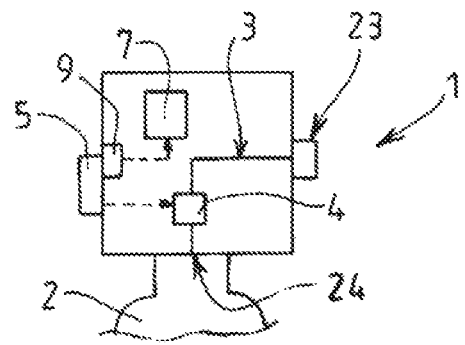
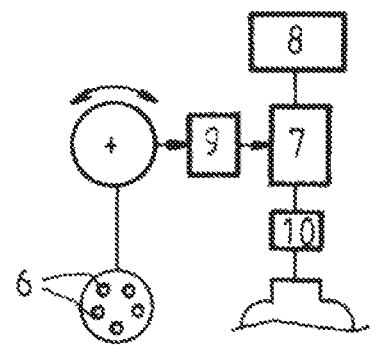
FIG.1
FIG.2
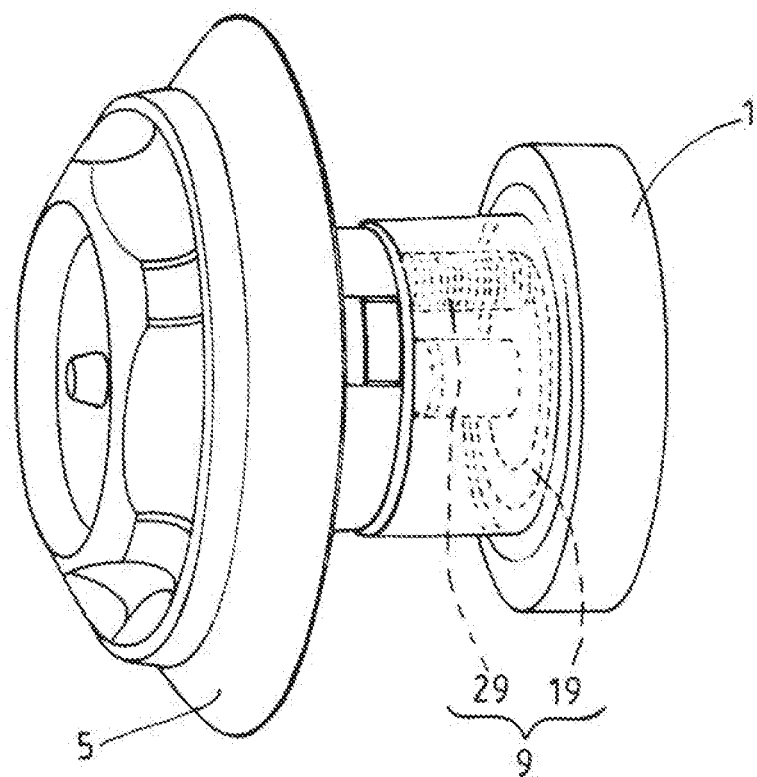
FIG.3

VALVE AND PRESSURIZED FLUID CYLINDER

CROSS REFERENCE TO RELATED APPLICATIONS

This application claims the benefit of priority under 35 U.S.C. § 119 (a) and (b) to French Patent Application No. 1762416, filed De. 19, 2017, the entire contents of which are incorporated herein by reference.

BACKGROUND

The invention relates to a valve for a pressurized fluid cylinder and to a corresponding cylinder.

The invention relates more particularly to a valve for a pressurized fluid cylinder, comprising a body provided with an end intended to be connected to the orifice of a pressurized fluid cylinder, the body of the valve accommodating a withdrawing circuit comprising a first, upstream end intended to communicate with the storage volume of a pressurized fluid cylinder and a second, downstream end intended to be connected to a consumer of the withdrawn gas, the withdrawing circuit comprising a member for regulating the flow rate and/or the pressure of the withdrawn fluid between the upstream end and downstream end, the valve comprising a member for manually controlling the regulating member, the control member being mounted so as to be able to move relative to the body of the valve and cooperating with the regulating member to control the flow rate and/or the pressure of fluid allowed to circulate from the upstream end to the downstream end depending on the position of the control member with respect to the body of the valve, the valve comprising a sensor for sensing the position of the control member, said sensor being configured to generate an electric signal indicative of the position of the latter or of the fluid flow rate and/or pressure set by the regulating member.

The invention relates to a valve provided with an electronic device for indicating physical data relating to the content notably of pressurized gas in a pressurized fluid cylinder.

Reference may be made for example to the document WO2015110717A1, which describes an example of such a device. That document describes a valve provided with a detector for detecting the position of the flow-rate selector. This makes it possible to more rapidly display and/or calculate the instantaneous consumption of gas, the quantity of gas remaining in the cylinder, and the gas autonomy until the cylinder is empty. That document describes in particular a position sensor using a potentiometer and a mechanism that meshes with the manual selector, wherein a movable part of the mechanism forms the wiper of the potentiometer.

This solution makes it possible to reliably detect the position of the selector. However, this detector structure has drawbacks including: a relatively large size, a relatively high number of parts (gear etc.), leaktightness that is difficult to realize (with respect to sand or dust in particular), difficult management of the axial and radial clearances, etc.

SUMMARY

An aim of the present invention is to remedy all or some of the drawbacks of the prior art that are set out above.

To this end, the valve according to the invention, which is otherwise in accordance with the generic definition given in the preamble above, is essentially characterized in that the sensor for sensing the position of the control member comprises a conductive circuit having a given electrical resistance, a member for measuring an electric variable of the conductive circuit and a wiper, the conductive circuit and the wiper being movable relative to one another during the movement of the control member with respect to the body of the valve into different configurations in which the wiper modifies the shape and/or area of the conductive circuit measured by the measuring member.

Furthermore, embodiments of the invention can include one or more of the following features:
- the conductive circuit is mounted in a fixed manner relative to the body of the valve and the wiper is mounted on the control member, that is to say in a movable manner relative to the body of the valve,
- the conductive circuit comprises a continuous path, the wiper being movable along at least a part of the path,
- the wiper delimits one end of the path,
- the measuring member is configured to measure the voltage or the current and/or the resistance and has a measuring terminal connected to one end of the path and another measuring terminal connected to an end of the path that is delimited by the wiper,
- in at least one position of the control member, the wiper does not make electrical contact with the path of the conductive circuit and so no electrical measurement is taken by the measuring member,
- the position sensor comprises three terminals or ends connected to the measuring member, two measuring terminals of the measuring member being connected respectively to two ends of the conductive circuit, the third measuring terminal of the measuring member being connected to the point of contact of the wiper with the conductive circuit,
- the conductive circuit is situated next to a flexible conductive zone disposed in a manner spaced apart from the conductive circuit; in a plurality of active positions of the control member, the wiper bearing against the flexible conductive zone and elastically deforming this conductive zone locally so as to form localized electrical contact between the conductive zone and the conductive circuit,
- the conductive circuit and the conductive zone have different electrical resistances,
- the flexible conductive zone is deposited on or integrated in a flexible first support, the conductive circuit being deposited on or integrated in a second support, the sensor also comprising a set of spacer(s) disposed between the two supports and ensuring the spacing of the conductive zone with respect to the conductive circuit, the two supports and the set of spacer(s) delimiting a housing,
- one of the conductive zone and the conductive circuit is covered with or enclosed in a protective membrane,
- the housing is covered with or enclosed in a flexible protective membrane,
- at least one of the conductive circuit and the conductive zone comprises a layer of conductive material deposited on or integrated in a surface of an electrically insulating support,
- the valve comprises a member for acquiring, storing and processing data, the position sensor being connected to the latter in order to transmit a signal indicative of the position of the regulating member and/or of the fluid flow rate and/or pressure set by the regulating member, the valve comprises at least one data display and/or a data emitter connected to the member for acquiring, storing and processing data, the conductive circuit has a width of between 0.001 mm and 50 mm and preferably between 0.1 mm and 15 mm, the conductive circuit has a thickness of between a nanometre and 10 mm and preferably between 0.05 mm and 2 mm, the position sensor generates a signal of given voltage and/or resistance value depending on the position of the control member with respect to the body of the valve, the position sensor forms a potentiometer, the member for manually controlling the regulating member is movable into a position known as the "closed" position corresponding to closure of the first withdrawing circuit, that is to say that the flow rate of fluid allowed to pass from the upstream end to the downstream end is zero, the three terminals of the conductive circuit form a three-wire system with two resistive output channels and an electrical collector channel forming a membrane potentiometer, the member for acquiring, storing and processing data is configured to cause an information item relating to the fluid flow rate and/or pressure set by the regulating member and/or to the mode of use of the valve to be displayed on the display, or, respectively, to be sent via the data emitter, in response to the reception of the signal transmitted by the position sensor, the electrical contact located between the conductive zone and the conductive circuit realized by the wiper causes electric current to flow between a first end of the conductive circuit (connected to one terminal of the measuring member) as far as the contact point between the conductive circuit and the conductive zone, the current then passing through the conductive zone as far as an end of this conductive zone connected to another terminal of the measuring member.

The invention also relates to a pressurized fluid cylinder comprising a valve according to any one of the above or following features.

The invention can also relate to any alternative device or method comprising any combination of the above or following features within the scope of the claims.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 shows a schematic and partial side view illustrating a valve mounted on a pressurized gas cylinder according to one possible exemplary embodiment of the invention, FIG. 2 schematically and partially illustrates the structure and operation of a part of the valve from FIG. 1, FIG. 3 shows a schematic and partial perspective view illustrating one possible example of the structure and operation of a position sensor integrated into a control member of a valve.

DETAILED DESCRIPTION OF PREFERRED EMBODIMENTS

Figure 4:
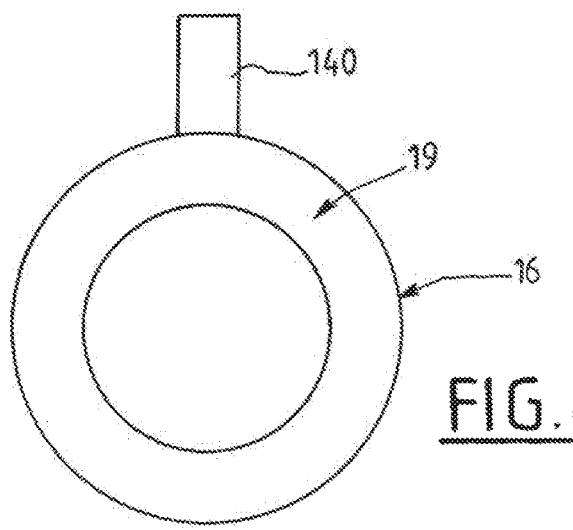
FIG. 4 shows a schematic and partial front view illustrating a detail of the position sensor from FIG. 3.

FIG. 1 schematically shows a pressurized gas cylinder 2 provided with a valve 1 that is able to implement the invention.

The valve 1 comprises a body provided with an end intended to be mounted in the orifice of a pressurized fluid cylinder 2 (for example by screwing). Alternatively, the valve 1 can be connected, via a circuit, to a set of cylinder(s).

In a conventional manner, the body of the valve 1 accommodates a withdrawing circuit 3 comprising a first, upstream end 24 communicating with the storage volume of the cylinder 2. The withdrawing circuit 3 comprises a second, downstream end 23 intended to be connected to a consumer of the withdrawn gas (for example a patient in the case of oxygen or some other medical gas).

The withdrawing circuit 3 comprises a member 4 for regulating the flow rate and/or the pressure of the withdrawn fluid between the upstream end 24 and downstream end 23. This regulating member 4 is for example a flow rate regulator having calibrated orifices 6, making it possible to select a withdrawn gas flow rate (cf. the schematic depiction in FIG. 2). Of course, any other regulating member is conceivable, for example a valve with a proportional opening.

The valve 1 comprises a member 5 for manually controlling the regulating member 4. The control member 5 is mounted so as to be able to move relative to the body of the valve 1 and cooperates with the regulating member 4 to control the flow rate and/or pressure of fluid allowed to circulate depending on the position of the control member 5 with respect to the body of the valve 1.

The control member 5 comprises for example a rotary hand wheel. Of course, any other appropriate system is conceivable (pivoting lever, etc.). For example, the control member 5 selects a calibrated orifice 6 and/or controls a flow rate restriction valve depending on its position among a plurality of separate (preferably stable) positions or a plurality of positions of a continuous movement. In particular, the stable positions can be mechanically referenced by a hard point (for example via a detent system in particular).

The valve 1 comprises an electronic device for indicating data relating to the content of fluid in a cylinder 2 connected to the valve 1. The device can be of the type comprising a member 7 for acquiring, storing and processing data and at least one data display 8 connected to the member 7 for acquiring, storing and processing data (cf. FIGS. 1 and 2).

The member 7 for acquiring, storing and processing data comprises for example a calculator and/or computer and/or a microprocessor or any other equivalent system.

Of course, this device can have one or more data receiving members (via a wired and/or wireless connection:

antenna(s), port(s) etc.) and also one or more data output members (via a wired and/or wireless connection: antenna(s), port(s)).

The valve 1 has a sensor 9 for sensing the position of the member 5 for manually controlling the regulating member 4. The position sensor 9 is connected to the member 7 for acquiring, storing and processing data in order to transmit to the latter a signal indicative of the position of the control member 5 or directly a signal corresponding to the fluid flow rate and/or pressure set by the regulating member 4.

The sensor 9 for sensing the position of the control member 5 comprises for example a converter for converting the mechanical movement of the control member 5 into an electrical signal that is exploitable by the member 7 for acquiring, storing and processing data.

The position sensor 9 supplies for example an electrical or digital signal determined depending on the position of the control member 5. This signal can be supplied in a wired and/or wireless manner.

The position sensor 9 comprises a conductive circuit 19 comprising at least one conductor track having a given electrical resistance. This conductive circuit 19 is situated preferably on a fixed part of the valve 1.

Figure 6:
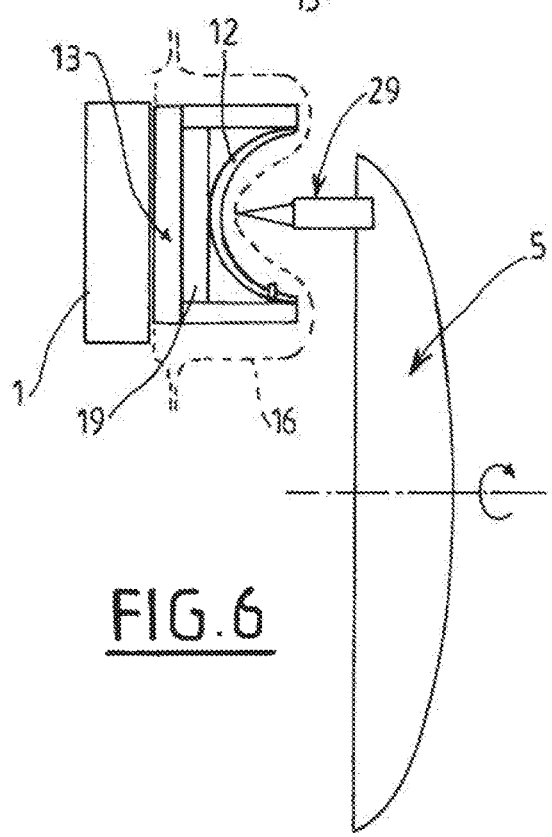
FIG. 6 shows a schematic and partial cross-sectional view illustrating a detail of the position sensor cooperating with the control member according to one possible embodiment.

For example, the conductive circuit 19 is a strip of small thickness disposed in a plane perpendicular to the axis of rotation of the control member 5 (rotary thumb wheel, cf. FIG. 6 in particular).

The sensor 9 also comprises a member 11 for measuring an electric variable of the conductive circuit 19 (voltage and/or resistance in particular) and a wiper 29. The measuring member 11 is for example a voltmeter, an ohmmeter, a microprocessor or any other suitable piece of equipment or any combination of these examples.

The wiper 29 is mounted on the member of the control member 5 and is thus movable relative to the conductive circuit 19 when the control member 5 is moved. The wiper 29 comprises for example a boss or pin perpendicular to the plane of the conductive circuit 19.

Of course, alternatively, the conductive circuit 19 could be situated on the (movable) control member 5 and the wiper 29 on the fixed part of the valve.

Thus, the conductive circuit 19 and the wiper 29 are movable relative to one another during the movement (rotation for example) of the control member 5 with respect to the body of the valve 1 into different configurations. In these different configurations, the wiper 29 modifies the shape and/or the area of the conductive circuit 19 measured by the measuring member 11. In other words, the relative movement of the wiper 29 changes the electrical signature (voltage and/or resistance measured by the measuring member 11).

As illustrated in FIGS. 3, 4, 7, 8 and 10, the conductive circuit 19 preferably comprises a continuous path. This path corresponds to the path of movement of the wiper 29 and is thus circular in the example of a rotary control member 5 (a circular arc or a complete circle, for example). Specifically, the wiper 29 is movable along at least a part of the path.

The circle or circular arc can be centred on the axis of rotation of the rotary control member 5.

The conductive circuit 19 comprises a layer of conductive material, for example a metallic ink, in particular aluminium ink, deposited on a surface of a support 13. Of course, any other type of structure or shape of conductor track is conceivable.

For example, the conductive circuit 19 has a thickness of between a nanometer and 10 mm and preferably between 0.05 mm and 2 mm. The conductive circuit 19 can have a length (perimeter in the context of a circle or circular arc) which may be between 0.1 cm and 50 cm, in particular between 2 cm and 30 cm, and more particularly between 5 cm and 20 cm.

Similarly, the width of the conductive circuit 19 (width of the path) may be between 0.001 cm and 10 cm and preferably between 0.5 cm and 3 cm, in particular between 0.1 and 1.5 cm.

For example, the conductive circuit 19 is deposited on or bonded to a support 13 (or integrated therein). The support can be a plate 13 for example. This plate 13 is preferably a support that is not electrically conductive, for example a plastic.

The measuring member 11 can be configured to measure the voltage and/or current and/or the resistance (in particular via the relationship $U=R.I$) and can have a first measuring terminal connected to a first end of the path (for example at a connecting end 140). The measuring member 11 can have a second measuring terminal connected to the end of the path that is delimited by the wiper 29.

Figure 7:
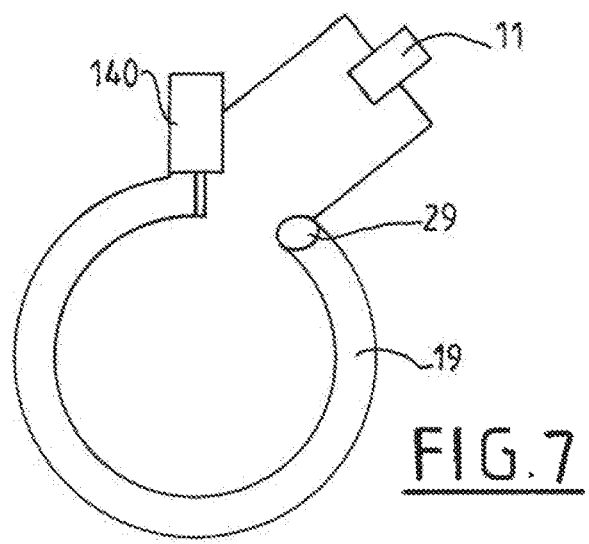
FIG. 7 shows a schematic and partial front view illustrating a detail of the position sensor.
Figure 8:
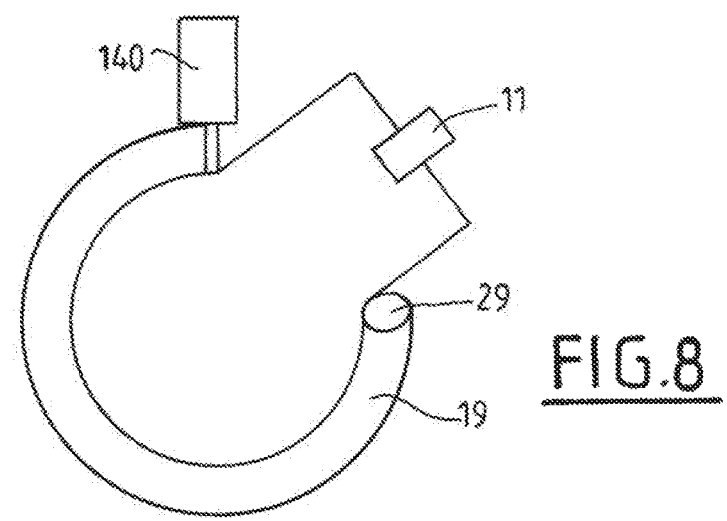
FIG. 8 shows a schematic and partial front view illustrating a detail of the position sensor.
Figure 10:
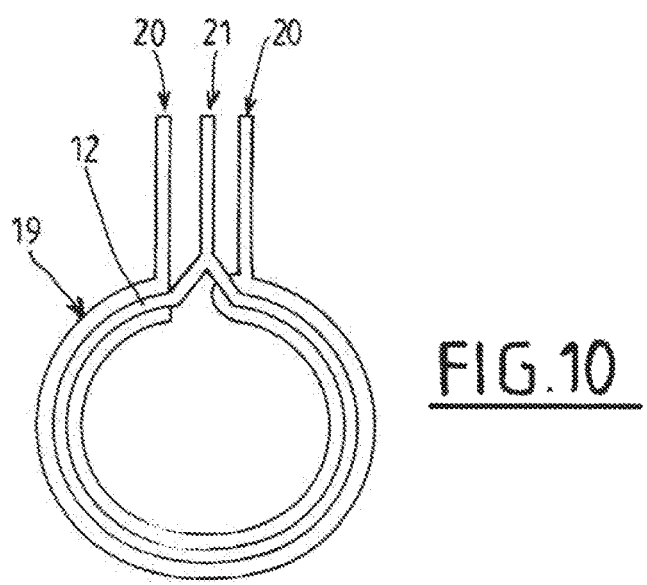
FIG. 10 shows a schematic and partial front view illustrating a detail of the position sensor according to another possible embodiment.

As illustrated in FIGS. 7 and 8, the movable wiper 29 delimits an end of the path measured by the measuring member 11. This measured path is more or less long (higher or lower resistance) depending on the position of the wiper 29 relative to the conductive circuit 19.

In the depictions in FIGS. 5, 6, 9 and 10, the sensor comprises a conductive zone 12 situated next to the conductive circuit 19.

This conductive zone 12 preferably has the same overall shape (path/track) as the conductive circuit 19.

For example, two ends 20 of the conductive circuit 19 are connected respectively to two terminals of the measuring member 11. One end 21 of the conductive zone 12 can be connected to a third terminal of the measuring member 11.

These three terminals can be likened to a three-wire system with two resistive output channels and an electrical collector channel. This can be likened to a potentiometer (in particular a membrane potentiometer). It can operate electronically in the same way. Thus, depending on the location at which the wiper 29 bears, the resistance value measured by the measuring member 11 will be different (compared with a reference resistance, for example a given maximum resistance).

Thus, it is the resistive value corresponding to the position of the wiper 29 that will indicate the position of the control member 5.

The position sensor 9 thus makes it possible to obtain measured resistance values that differ depending on whether a pressure (wiper 29) is applied at different locations on a conductive circuit 19.

Of course, alternatively, the opposite could be the case (one end of the conductive circuit 19 connected to a terminal of the measuring member 11 and two ends of the conductive zone 12 connected respectively to two other terminals of the measuring member 11).

Similarly, configurations with more than three ends/measuring terminals are conceivable.

Similarly, configurations with only two measuring terminals are conceivable (cf. above according to FIG. 7 or 8 or by providing a single measuring terminal for one end of the conductive circuit 19 and one end of the conductive zone 12 connected to another terminal of the measuring member 11).

In the case of such a configuration with two measuring terminals, it is thus conceivable to measure only a variable resistance (without having a maximum reference value as in the case of a configuration with three or more terminals as described above).

Preferably, the conductive zone 12 is spaced apart from the measuring circuit 19 (distance of between 0.01 mm and 10 mm for example).

Figure 5:
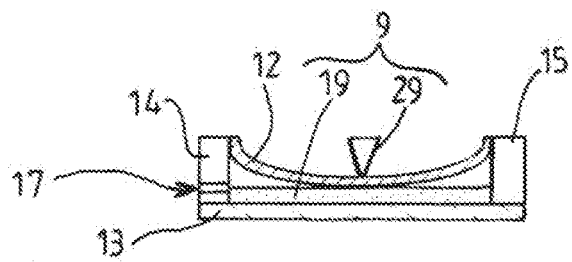
FIG. 5 shows a schematic and partial cross-sectional view illustrating a detail of the position sensor according to one possible embodiment.

The wiper 29 bears on the conductive zone 12 and deforms it locally in order to make electrical contact between the conductive zone 12 and the conductive circuit 19 (cf. FIG. 5 or 6).

In other words, the wiper 29, by deforming the conductive zone 12 (which is preferably flexible), allows contact at a given point between the conductive zone 12 and the conductive circuit 19.

Preferably, the conductive zone 12 and the conductive circuit 19 have resistances (total resistances and/or resistances per unit of distance) that are different and determined. For example, the resistances can be very low and in particular between zero and 10 megaohms.

The difference in resistance can be obtained via a thickness and/or a pigmentation and/or a composition and/or a number of layers and/or a material that is/are different.

When such contact is established, the sensor 9 generates an electric current which flows in the electric circuit 19 between a first end 20 of this electric circuit 19 and the point of contact with the conductive zone 12. The current then continues to flow in the conductive zone 12 from the point of contact as far as the end connected to the measuring member 11. Thus, depending on the contact position, the path covered by the current in a portion of respective given resistance will bring about a different measurement for the sensor 11 (voltage/resistance etc.).

The position is determined precisely via a simple conductive circuit 19, 12 of small size.

As illustrated in FIGS. 5 and 6, the conductive circuit 19 can be situated next to the conductive zone 12, which is flexible or mounted on a flexible support.

The conductive zone 12 is disposed in a manner spaced apart from the conductive circuit 19.

The wiper 29 can bear on the conductive zone 12 and can elastically deform the former locally so as to form localized electrical contact with the circuit 19. This electrical contact can be the contact point connected to a terminal of the measuring member 11.

Thus, when the wiper 29 (boss) makes contact with the conductive circuit 19, the two conductor tracks 12, 19 come into contact and delimit the path of which the resistance is measured. The maximum resistance value affords a measurement range that makes it possible to differentiate a plurality of positions of the control member 5.

The two elements (movable 29 and fixed 19) of the sensor 9 are thus preferably separated, allowing them not to touch when at rest and therefore not to conduct a current (open circuit). This can be exploited in at least one position of the control member 5 (cf. below in particular when the control member 5 is in a closed position of the circuit 3 of the valve).

The two elements 12, 19 can be spaced apart from one another via a set of insulating spacer(s) 15.

For example, the conductive circuit 19 is secured to an insulating support 13 fixed to the body of the valve 1 or an element of the valve.

The assembly comprising the conductive circuit 19 and the conductive zone 12 can be housed in a protective membrane 16 (which is for example leaktight and/or flexible), cf. FIG. 6.

Figure 9:
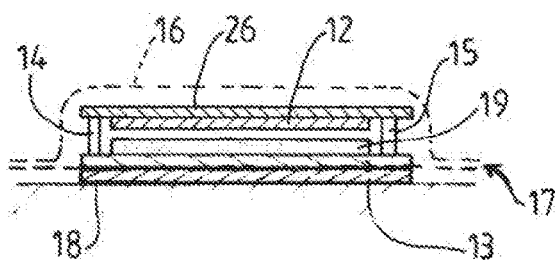
FIG. 9 shows a schematic and partial cross-sectional view illustrating a detail of the structure of the position sensor cooperating with the control member according to another possible embodiment.

In the embodiment in FIG. 9, the device comprises (from top to bottom in the figure):

a non-conductive support 26 (plate for example),
the conductive zone 12 secured to one face of said support 26,
an insulating spacing (for example air via a system of spacers 14, 15),
the conductive circuit 19,
an insulating support 13 such as a plate for example (the conductive circuit 19 being connected to or integrated into this support),
and an adhesive layer 18 for keeping this sensor on a part of the valve or a member of the valve.

As illustrated, this assembly can be housed in a protective membrane 16. Preferably, the membrane 16 is flexible and can be leaktight.

For example, this membrane 16 can be made of at least one material from among: flexible or rigid plastic, in particular polyester.

The supports 26, 13 and spacers 14, 15 can delimit a housing.

This housing (and/or the membrane 16) can comprise at least one orifice 17. This orifice 17 makes it possible to avoid any undesirable movement of the plates 12, 13 (movement away from or towards one another in the case of a change in pressure and/or temperature of the air contained in this housing or in the membrane 16.

It should be noted that at least one of the supports 26, 13 can be secured to the membrane 16 (for example bonded to and/or integrated into the membrane 16).

As illustrated schematically in FIG. 2, the valve 1 can also have a pressure sensor 10 intended to measure the pressure within the storage volume of the cylinder 2. The pressure sensor 10 can be connected to the member 7 for acquiring, storing and processing data in order to transmit to the latter a signal indicative of the measured fluid pressure. The member 7 for acquiring, storing and processing data can be configured to calculate and display on the display 8 an information item relating to the autonomy or content of fluid remaining in the cylinder 2 in response to the reception of this pressure signal (also on the basis preferably of the information given by the sensor 9 for sensing the position of the control member 5 which determines the flow rate withdrawn from the cylinder 2).

For example, the information relating to the autonomy or content of fluid remaining in the cylinder 2 can be expressed in time remaining (or, respectively, in quantity remaining) by dividing the initial pressure measured by the pressure sensor 10 (or, respectively, a quantity of gas flowing) by the theoretical variation in pressure set by the regulating member 4 (or, respectively, the variation in quantity set by the regulating member (4)), by a formula for example of the type: Time remaining=Initial pressure/variation in pressure set (or, respectively: Time remaining=Remaining fluid content/variation in quantity set).

The theoretical variations in quantity or pressure can be calculated for example via the perfect gas equation $PV=nRT$ or real gas equation $PV=ZnRT$ (S.I. units).

The volume V of the cylinder 2 can be known and entered in the member 7 for acquiring, storing and processing data and the temperature can be measured by an exterior ambient sensor or calculated or entered or approximated.

The position sensor 9 system has the advantage of reliable detection without being bulky. The flat conductive circuit 28 is in particular easy to integrate into a cramped volume. Moreover, this position sensor solution does not require the provision of electric wires associated with a moving part of the mechanism. The number of parts is also reduced (in particular compared with a system using several sensors and/or several elements to be detected by the sensors).

The position sensor can be easily calibrated in order to ensure good reproducibility in mass production.

At least one of the position sensor 9 and the pressure sensor 10, the display 8, the member 7 for acquiring, storing and processing data can be powered electrically by a battery and/or an inductive system.

Preferably, the member 5 for manually controlling the regulating member 4 can be moved into a position known as the "closed" position corresponding to closure of the withdrawing circuit 3. In other words, the flow rate of fluid allowed to pass from the upstream end 13 to the downstream end 23 is zero.

Preferably, in the closed position of the control member 5, the position sensor 9 consumes no energy. For example, the wiper 29 does not make contact with the path of the conductive circuit 19 (measuring circuit of the member 11 is open).

In other words, in this position of the control member 5 (or one or another position), the wiper 29 causes no electrical contact with the conductive circuit 19. Therefore, there is no energy consumption in this position.

Although not shown for the sake of simplification, the valve 1 can comprise another filling and/or withdrawing circuit, for example separate from the withdrawing circuit 3. If need be, this second filling circuit can have a portion in common with the withdrawing circuit 3.

The invention applies advantageously to pressurized gas cylinders, notably cylinders containing pressurized oxygen.

The solution can relate in particular to rotary flow rate selectors that can be located on the valve (for example with a relief valve) of a pressurized cylinder. More particularly, the solution proposes a detection system that makes it possible to know the flow rate selected by the user by virtue of the detected position of the rotary element.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A valve for a pressurized fluid cylinder, comprising a body provided with an end configured to connect to an orifice of the pressurized fluid cylinder, the body of the valve (1) accommodating a withdrawing circuit (3) comprising a first, upstream end (24) configured to communicate with a storage volume of the pressurized fluid cylinder and a second, downstream end (23) configured to connect to a consumer of a withdrawn gas, the withdrawing circuit (3) comprising a regulating member (4) for regulating the flow rate and/or the pressure of a withdrawn fluid between the upstream end (24) and downstream end (23), the valve (1) comprising a control member (5) for manually controlling the regulating member (4), the control member (5) configured to move relative to the body of the valve (1) and cooperating with the regulating member (4) to control the flow rate and/or the pressure of fluid allowed to circulate from the upstream end (24) to the downstream end (23) depending on the position of the control member (5) with respect to the body of the valve (1), the valve (1) comprising a sensor (9) for sensing the position of the control member (5), said sensor (9) being configured to generate an electric signal indicative of the position of the latter or of the fluid flow rate and/or pressure set by the regulating member (4), the sensor (9) for sensing the position of the control member (5) comprising a conductive circuit (19) having a given electrical resistance, a measuring member (11) for measuring an electric variable of the conductive circuit (19) and a wiper (29), wherein the conductive circuit (19) and the wiper (29) are movable relative to one another during the movement of the control member (5) with respect to the body of the valve (1) into different configurations in which the wiper (29) modifies the shape and/or area of the conductive circuit (19) measured by the measuring member (11), wherein the conductive circuit (19) is situated next to a flexible conductive zone (12) disposed in a manner spaced apart from the conductive circuit (19), and wherein, in a plurality of active positions of the control member (5), the wiper (29) bears against the flexible conductive zone (12) and elastically deforms this conductive zone (12) locally so as to form localized electrical contact between the conductive zone (12) and the conductive circuit (19).

2. The valve according to claim 1, wherein the flexible conductive zone (12) is deposited on or integrated in a flexible first support (26), the conductive circuit (19) being deposited on or integrated in a second support (13), the sensor also comprising a set of spacer(s) (15) disposed between the two supports (26, 13) and ensuring the spacing of the conductive zone (12) with respect to the conductive circuit (19), the two supports (26, 13) and the set of spacer(s) (15) delimiting a housing.

3. The valve according to claim 2, wherein the housing is covered with or enclosed in a flexible protective membrane (16).

4. The valve according to claim 2, wherein at least one of the conductive circuit (19) and the conductive zone (12) comprises a layer of conductive material deposited on or integrated in a surface of an electrically insulating support.

5. The valve according to claim 1, wherein the conductive circuit (19) and the conductive zone (12) have different electrical resistances.

6. The valve according to claim 1, wherein at least one of the conductive zone (12) and the conductive circuit (19) is covered with or enclosed in a protective membrane (16).

* * * * *